United States Patent
Ito et al.

(10) Patent No.: US 9,821,840 B2
(45) Date of Patent: Nov. 21, 2017

(54) HYDRAULIC CONTROL DEVICE AND CONSTRUCTION MACHINERY INCLUDING SAME

(71) Applicants: KAWASAKI JUKOGYO KABUSHIKI KAISHA, Kobe-shi, Hyogo (JP); KABUSHIKI KAISHA KCM, Kako-gun, Hyogo (JP)

(72) Inventors: Makoto Ito, Kobe (JP); Ryo Yamamoto, Kobe (JP); Kazuto Fujiyama, Kobe (JP); Hiroyasu Kodera, Kobe (JP); Shinichiro Tanaka, Kakogawa (JP)

(73) Assignee: KABUSHIKI KAISHA KCM, Kako-gun (JP)

( * ) Notice: Subject to any disclaimer, the term of this patent is extended or adjusted under 35 U.S.C. 154(b) by 199 days.

(21) Appl. No.: 14/364,018

(22) PCT Filed: Nov. 30, 2012

(86) PCT No.: PCT/JP2012/007710
§ 371 (c)(1),
(2) Date: Jun. 9, 2014

(87) PCT Pub. No.: WO2013/084456
PCT Pub. Date: Jun. 13, 2013

(65) Prior Publication Data
US 2014/0318116 A1    Oct. 30, 2014

(30) Foreign Application Priority Data
Dec. 8, 2011   (JP) ................. 2011-269293

(51) Int. Cl.
*B62D 5/07*    (2006.01)
*F15B 11/042*    (2006.01)
(Continued)

(52) U.S. Cl.
CPC .............. *B62D 5/075* (2013.01); *B62D 5/065* (2013.01); *B62D 5/07* (2013.01); *E02F 9/0841* (2013.01);
(Continued)

(58) Field of Classification Search
CPC .......... B62D 5/065; B62D 5/07; B62D 5/075; E02F 9/0841; E02F 9/225; E02F 9/2282;
(Continued)

(56) References Cited

U.S. PATENT DOCUMENTS 4,463,557 A * 8/1984 Miller ................ B62D 5/07
                                                       137/596.13
5,152,143 A * 10/1992 Kajita ................ E02F 9/2228
                                                       60/420

(Continued)

FOREIGN PATENT DOCUMENTS

DE    4304376 A1 * 8/1994 ............... B62D 5/07
JP    A-59-070245    4/1984
(Continued)

OTHER PUBLICATIONS

International Search Report issued in International Application No. PCT/JP2012/007710 dated Feb. 12, 2013.

*Primary Examiner* — Logan Kraft
(74) *Attorney, Agent, or Firm* — Oliff PLC

(57) ABSTRACT

A hydraulic control device includes: a hydraulic pump connected in parallel to steering and boom cylinders; a steering control valve that controls the direction of operating oil flowing through the steering cylinders; a boom control valve that connects the hydraulic pump to a tank when the valve is at a neutral position and controls the direction of the oil flowing through the boom cylinders when the valve is at an offset position; a meter-in pressure compensator that increases flow rate of the oil flowing through a variable
(Continued)

restrictor of the steering control valve in accordance with pressure in front of and behind the restrictor; and a bleed-off pressure compensator that decreases flow rate of the oil flowing through the boom control valve in accordance with the increase in pressure of the oil flowing through the steering cylinders to maintain the predetermined pressure of the oil in the steering control circuit.

16 Claims, 5 Drawing Sheets

(51) Int. Cl.
*B62D 5/065* (2006.01)
*E02F 9/22* (2006.01)
*F15B 11/16* (2006.01)
*E02F 9/08* (2006.01)

(52) U.S. Cl.
CPC ............ *E02F 9/225* (2013.01); *E02F 9/2282* (2013.01); *E02F 9/2285* (2013.01); *E02F 9/2296* (2013.01); *F15B 11/042* (2013.01); *F15B 11/162* (2013.01); *F15B 11/167* (2013.01); *F15B 2211/351* (2013.01); *F15B 2211/455* (2013.01)

(58) Field of Classification Search
CPC ..... E02F 9/2285; E02F 9/2296; F15B 11/162; F15B 11/167; F15B 11/042; F15B 11/0426; F15B 2211/351; F15B 2211/455
See application file for complete search history.

(56) References Cited

U.S. PATENT DOCUMENTS

| | | | |
|---|---|---|---|
| 6,769,348 B2 * | 8/2004 | Hudson | ................ E02F 9/2221 60/452 |
| 2008/0209903 A1 | 9/2008 | Itoga et al. | |
| 2009/0255750 A1 | 10/2009 | Nakamura et al. | |
| 2010/0228439 A1 | 9/2010 | Nakamura et al. | |

FOREIGN PATENT DOCUMENTS

| | | |
|---|---|---|
| JP | A-2006-027351 | 2/2006 |
| WO | WO 2006/006448 A1 | 1/2006 |
| WO | WO 2008/075568 A1 | 6/2008 |
| WO | WO 2008/081843 A1 | 7/2008 |

* cited by examiner

HYDRAULIC CONTROL DEVICE AND CONSTRUCTION MACHINERY INCLUDING SAME

TECHNICAL FIELD

The present invention relates to a hydraulic control device including: a hydraulic pump to which a steering device and a work machine actuator are connected in parallel; a steering control valve configured to control the flow rate of oil flowing to the steering device; and an actuator control valve configured to control the flow rate of oil flowing to the work machine actuator, and a construction machinery including the hydraulic control device.

BACKGROUND ART

A self-running construction vehicle, such as a wheel loader, includes a steering actuator and can change the running direction of a vehicle main body thereof by supplying operating oil to the steering actuator. The steering actuator is connected to a hydraulic pump through a steering control valve. The steering control valve changes the direction of the operating oil flowing to the steering device in accordance with the operation of a handle. By changing the direction of the operating oil flowing to the steering actuator, the steering actuator extends or contracts, so that the running direction of the construction vehicle changes.

The construction vehicle includes a work machine cylinder, and for example, a work machine, such as a bucket, can be moved up and down by supplying the operating oil to the work machine cylinder. The work machine cylinder is connected to the hydraulic pump through a work machine control valve. The work machine control valve changes the direction of the operating oil flowing to the work machine in accordance with the operation of a lever, and by changing the direction of the operating oil flowing to the work machine cylinder, the work machine moves up or down.

Used as the work machine control valve is an open-center flow rate control valve. At a neutral position, the open-center flow rate control valve connects the hydraulic pump and a tank through a restrictor. Adopted as the hydraulic pump is a variable displacement hydraulic pump, and the hydraulic pump controls an ejection amount thereof in accordance with pressure generated at an upstream side of the restrictor.

The steering control valve and the work machine control valve are connected to a priority valve in parallel and further connected to the hydraulic pump through the priority valve. When driving the steering device, the priority valve preferentially supplies an operating fluid from the hydraulic pump to the steering control valve (see PTL 1, for example).

CITATION LIST

Patent Literature

PTL 1: Japanese Laid-Open Patent Application Publication No. 2006-27351

SUMMARY OF INVENTION

Technical Problem

FIGS. 5A and 5B are plan views respectively showing conventional wheel loaders 1A and 1B. FIG. 5A is a diagram showing the wheel loader 1A in which a priority valve 9 is integrated with a steering control valve 7, and FIG. 5B is a diagram showing the wheel loader 1B in which the priority valve 9 is integrated with a work machine control valve 8. In each of the wheel loaders 1A and 1B that are examples of the above construction vehicle, a vehicle main body thereof is divided into a rear chassis 2 that is a rear portion and a front chassis 3 that is a front portion, and these chassis 2 and 3 are connected to each other by a center pin 4 so as to be swingable.

An engine E configured to cause the vehicle main body to run is provided at a rear portion of the rear chassis 2, and a hydraulic pump 5 is coupled to the engine E. The rear chassis 2 is provided with a driver's seat 6, and the steering control valve 7 is provided under the driver's seat 6. The front chassis 3 is provided with the work machine control valve 8. In each of the wheel loaders 1A and 1B in each of which the steering control valve 7 and the work machine control valve 8 are arranged as above, the priority valve 9 may be arranged alone or may be arranged so as to be integrated with one of the hydraulic pump 5, the steering control valve 7, and the work machine control valve 8.

In a case where the priority valve 9 is arranged alone, a casing of the priority valve 9 needs to be additionally provided, so that the number of components provided at the rear chassis 2 or the front chassis 3 increases. In a case where the priority valve 9 is integrated with the hydraulic pump 5 to form a unit, the hydraulic pump 5 as the unit becomes a dedicated component. Therefore, the hydraulic pump 5 cannot be replaced with a general purpose hydraulic pump. Thus, the availability of the hydraulic pump 5 deteriorates.

A maximum flow rate of oil that can be supplied by the steering control valve 7 and a maximum flow rate of oil that can be supplied by the work machine control valve 8 are different from each other (generally, the maximum flow rate of the work machine control valve 8 is higher than that of the steering control valve 7). Therefore, to reduce pressure loss (energy loss) when the operating oil flows through the priority valve 9 configured to divide the operating oil flowing from the hydraulic pump 5, a spool of the priority valve 9 should be formed larger in diameter than a spool of the steering control valve 7 in accordance with a maximum flow rate of oil supplied to the work machine control valve 8. Therefore, the spool of the priority valve 9 is different in diameter from that of the steering control valve 7. In a case where the priority valve 9 is integrated with the steering control valve 7 as shown in FIG. 5A to form a unit, two spool holes that are different in diameter from each other need to be formed. On this account, in the unit configured by integrating the priority valve 9 with the steering control valve 7, these two spool holes need to be respectively processed by different processing devices. Thus, a large amount of labor is required when producing the unit.

As shown in FIG. 5B, in a case where the priority valve 9 is integrated with the work machine control valve 8, the spool of the work machine control valve 8 is substantially the same in diameter as the spool of the priority valve 9. Therefore, unlike the above case, a large amount of labor is not required when producing the unit. According to this configuration, since the priority valve 9 is provided at the front chassis 3, two pipes that are a pipe connecting the hydraulic pump 5 and the priority valve 9 and a pipe connecting the priority valve 9 and the steering control valve 7 extend over the center pin 4. Since these two pipes are pipes through which high-pressure operating oil flows at a high flow rate, it is difficult to arrange the pipes such that the pipes extend over the center pin 4.

As above, in the case of using the priority valve 9, various problems occur wherever at the vehicle main body the priority valve 9 is provided.

Here, an object of the present invention to provide a hydraulic control device capable of preferentially supplying operating oil from a hydraulic pump to a steering device without using a priority valve, and a construction machinery including the hydraulic control device.

Solution to Problem

A hydraulic control device of the present invention includes: a hydraulic pump connected to a steering device and a work machine actuator so as to supply operating oil to the steering device and the work machine in parallel; a steering control valve configured to cause a spool thereof to move to control a direction of the operating oil flowing to the steering device; an actuator control valve configured to connect the hydraulic pump to a tank when the actuator control valve is located at a neutral position and control the direction of the operating oil flowing through the work machine actuator when the actuator control valve is located at an offset position; a meter-in pressure compensator configured to control a flow of the operating oil, supplied to the steering control valve, to maintain differential pressure between pressure of the operating oil at an upstream side of the steering control valve and pressure of the operating oil at a downstream side of the steering control valve at constant pressure regardless of an opening degree of the spool of the steering control valve; and a bleed-off pressure compensator configured to control the flow of the operating oil supplied to the actuator control valve, utilize the pressure of the operating oil at the downstream side of the steering control valve as first pilot pressure, and utilize the pressure of the operating oil ejected from the hydraulic pump as second pilot pressure that acts against the first pilot pressure.

According to the present invention, the differential pressure between the pressure of the operating oil at the upstream side of the steering control valve and the pressure of the operating oil at the downstream side of the steering control valve is compensated by the meter-in pressure compensator, so that the operating oil can be supplied to the steering device at a flow rate corresponding to the opening degree of the steering control valve (that is, a flow rate corresponding to the displacement amount of the spool). In addition, by utilizing the pressure of the operating oil at the downstream side of the steering control valve as the first pilot pressure of the bleed-off pressure compensator, load pressure of the steering device can be reflected in the flow rate of the operating oil supplied through the bleed-off pressure compensator to the work machine actuator. With this, while securing the operating oil required by the steering device, the operating oil can also be supplied to the work machine actuator.

By providing the two control valves that are the meter-in pressure compensator and the bleed-off pressure compensator, these two control valves can be designed so as to respectively correspond to the steering control valve and the work machine control valve. Thus, a processing device for the steering control valve and the meter-in pressure compensator and a processing device for the work machine control valve and the bleed-off pressure compensator can be configured. In addition, by providing the two control valves, the meter-in pressure compensator and the bleed-off pressure compensator can be connected to the hydraulic pump in parallel. With this, a pipe connecting the hydraulic pump and the steering control valve and a pipe connecting the hydrau-lic pump and the work machine control valve can be independently arranged. Therefore, it becomes easy to realize the layout of the pipes through each of which a large amount of high-pressure operating oil flows to the steering control valve or the work machine control valve.

In the above invention, it is preferable that the bleed-off pressure compensator operate so as to: decrease the flow rate of the operating oil, supplied to the actuator control valve, in accordance with an increase in the pressure of the operating oil supplied to the steering device; and cause the pressure of the operating oil, ejected from the hydraulic pump, to become pressure higher than the pressure of the operating oil necessary to drive the steering device.

According to the present invention, the bleed-off pressure compensator decreases the flow rate of the operating oil flowing through the actuator control valve to cause the pressure of the operating oil flowing to the meter-in pressure compensator to become higher than working pressure necessary to drive the steering device. With this, the operating oil having the pressure higher than the working pressure necessary to drive the steering device easily flows toward the steering device. Therefore, when driving the steering device, the operating oil from the hydraulic pump can be caused to preferentially flow to the steering device at a stable flow rate. To be specific, without using a priority valve, the operating oil can be caused to preferentially flow to the steering device at the stable flow rate.

In the above invention, it is preferable that: the hydraulic control device further include a restrictor interposed between the actuator control valve and the tank; and the hydraulic pump be a variable displacement pump configured to adjust an ejection flow rate thereof in accordance with the pressure of the operating oil flowing between the actuator control valve and the restrictor.

According to the above configuration, by causing the operating oil to preferentially flow to the steering device when driving the steering device, the flow rate of the operating oil flowing through the bleed-off pressure compensator to the restrictor decreases, so that the pressure generated at the upstream side of the restrictor decreases. In accordance with this pressure decrease, the hydraulic pump increases an ejection amount thereof. Thus, the operating oil can be supplied from the hydraulic pump to the steering device at the flow rate necessary to drive the steering device.

In the above invention, it is preferable that: the meter-in pressure compensator utilize the operating oil at the upstream side of the steering control valve and the operating oil at the downstream side of the steering control valve as two different pilot oil acting against each other; and the hydraulic control device further include a steering relief valve configured to discharge the pilot oil, which is the operating oil at the downstream side, to the tank when the pressure of the pilot oil, which is the operating oil at the downstream side, becomes predetermined pressure.

According to the above configuration, the pilot pressure can be prevented from becoming the predetermined pressure or higher. To be specific, the pressure of the operating oil flowing from the meter-in pressure compensator to the steering control valve can be prevented from becoming the predetermined pressure or higher. In addition, the flow rate of the operating fluid can be made lower than a predetermined value, and a desired amount of operating oil can be caused to flow to the steering device. With this, the spool diameter of the meter-in pressure compensator can be reduced in accordance with the flow rate of the operating oil flowing through the meter-in pressure compensator. Therefore, for example, the spool diameter of the meter-in pressure compensator can be configured to be the same as the spool diameter of the steering control valve, and even in a case where the meter-in pressure compensator is integrated with the steering control valve, it is easy to manufacture a unit configured by integrating the meter-in pressure compensator and the steering control valve.

A construction machinery of the present invention includes any one of the above hydraulic control devices. According to the present invention, the construction machinery including the above-described hydraulic control device can be realized.

Advantageous Effects of Invention

According to the present invention, the operating oil from the hydraulic pump can be preferentially supplied to the steering device, and the pipe connecting the hydraulic pump and the steering control valve and the pipe connecting the hydraulic pipe and the work machine control valve can be simplified.

The above object, other objects, features, and advantages of the present invention will be made clear by the following detailed explanation of preferred embodiments with reference to the attached drawings.

BRIEF DESCRIPTION OF DRAWINGS

FIG. 5A is a diagram showing a wheel loader 1A in which a priority valve is integrated with a steering control valve, and FIG. 5B is a diagram showing a wheel loader in which the priority valve is integrated with a work machine control valve.

DESCRIPTION OF EMBODIMENTS

Wheel Loader

Figure 1:
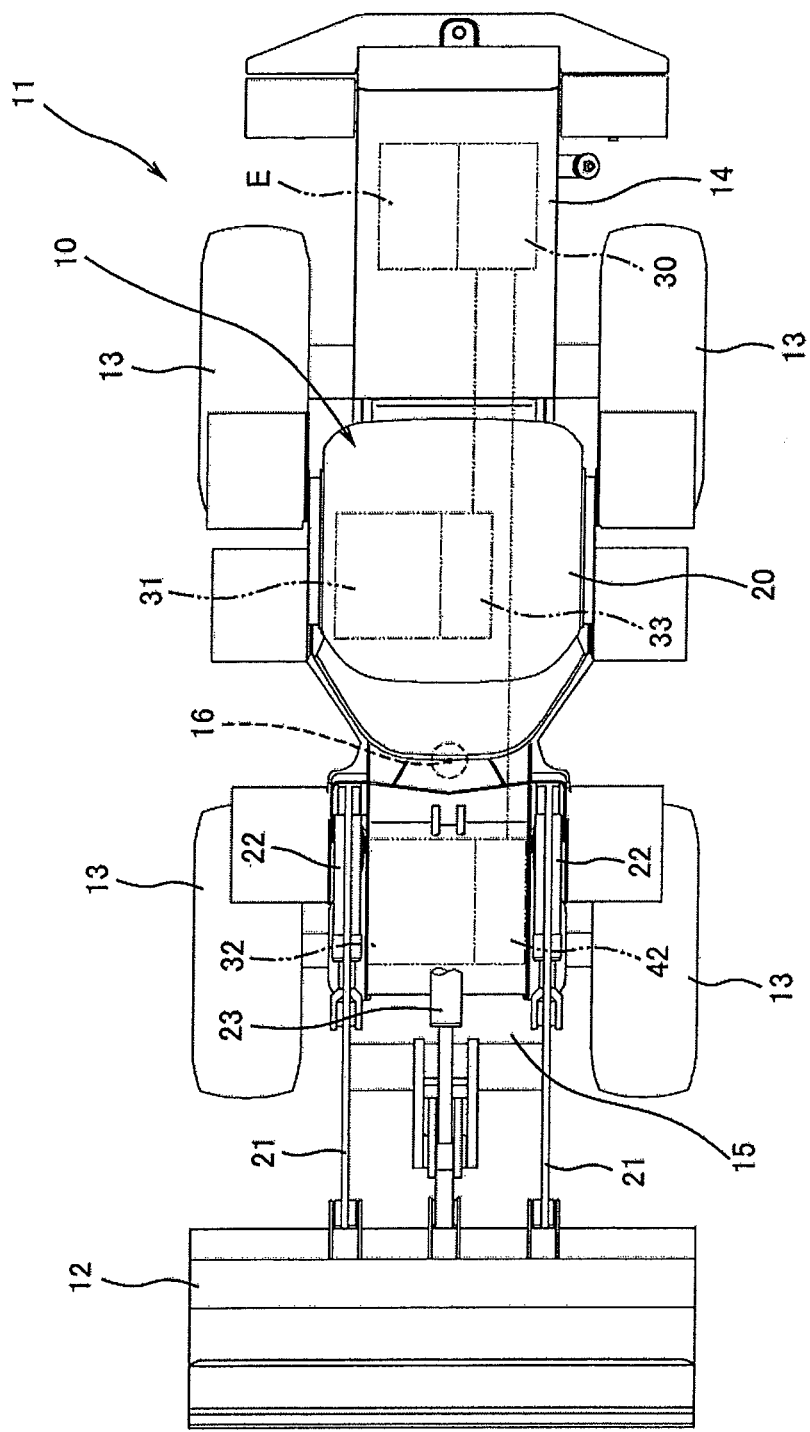
FIG. 1 is a plan view showing a wheel loader including a hydraulic control device of the present invention.

FIG. 1 is a plan view showing a wheel loader 11 including a hydraulic control device 10 of the present invention. The concept of directions described below coincides with the concept of directions when a driver of the wheel loader 11 faces in a running direction. The wheel loader 11 is a type of so-called construction machinery. For example, a bucket 12 is attached to a front portion of the wheel loader 11, and the wheel loader 11 can scoop up sand, rocks, and the like by the bucket 12. The component attached to the wheel loader 11 is not limited to the bucket 12 and may be an attachment, such as a fork or a snow removal attachment. The wheel loader 11 includes the engine E and four wheels 13, which are arranged at a vehicle main body thereof. The wheel loader 11 causes the wheels 13 to rotate by the engine E to run.

The vehicle main body of the wheel loader 11 is divided into a rear chassis 14 arranged at a rear portion thereof and a front chassis 15 arranged at a front portion thereof. These two chassis 14 and 15 are coupled to each other by a center pin 16 so as to be swingable. Two steering cylinders 18L and 18R (see FIG. 2) described below extend between the two chassis 14 and 15. The two steering cylinders 18L and 18R that are steering actuators are respectively arranged at left and right sides so as to sandwich the center pin 16. By supplying the operating oil to the two steering cylinders 18L and 18R, one of the two steering cylinders 18L and 18R contracts whereas the other extends. With this, the front chassis 15 swings relative to the rear chassis 14. Thus, the running direction of the wheel loader 11 can be changed.

The engine E is mounted on a rear portion of the rear chassis 14 configured as above, and a driver's seat 20 is provided at a front portion of the rear chassis 14. Two booms 21 configured to cause the bucket 12 to move up and down are provided at the front chassis 15 so as to be spaced apart from each other in a left-right direction. The booms 21 are provided at the front chassis 15 so as to be swingable in the upper-lower direction and are respectively provided with boom cylinders 22. By supplying the operating oil to the boom cylinders 22, the booms 21 move up and down. A tilt cylinder 23 configured to cause the bucket 12 to tilt in the upper-lower direction is provided at the front chassis 15. By supplying the operating oil to the tilt cylinder 23, the bucket 12 tilts.

As above, by supplying the operating oil to the steering cylinders 18L and 18R, the boom cylinders 22, and the tilt cylinder 23, the wheel loader 11 can change the running direction and cause the bucket 12 to move up and down and tilt. The wheel loader 11 includes the hydraulic control device 10 configured to supply the operating oil to the cylinders 18L, 18R, 22, and 23 to drive the cylinders 18L, 18R, 22, and 23.

Hydraulic Control Device

Figure 2:
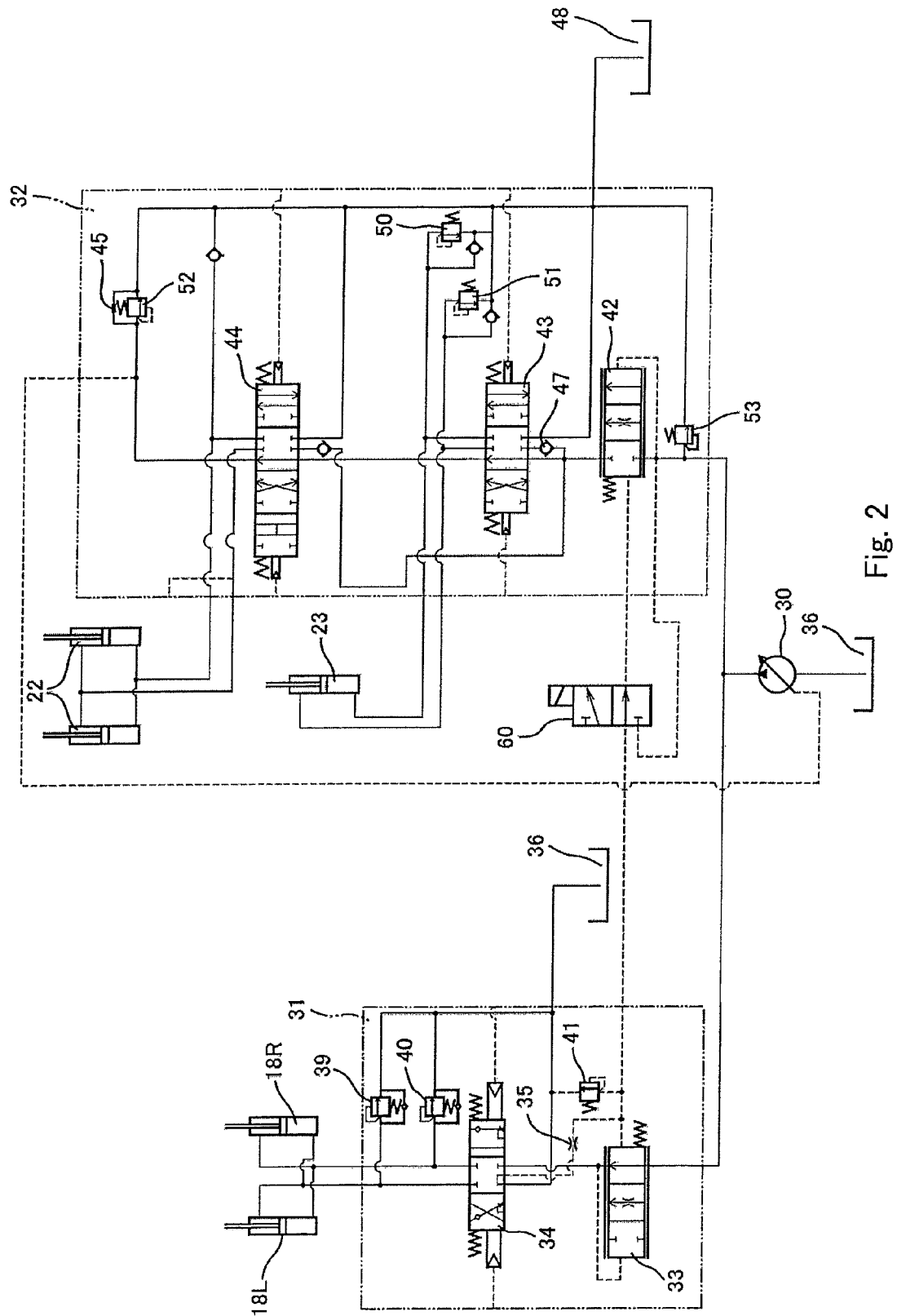
FIG. 2 is a circuit diagram showing a hydraulic circuit of the hydraulic control device.

FIG. 2 is a circuit diagram showing a hydraulic circuit of the hydraulic control device 10. The hydraulic control device 10 basically includes a hydraulic pump 30, a steering control circuit 31, and a work machine control circuit 32. The hydraulic pump 30 is a so-called variable displacement hydraulic pump and is coupled to the engine E. The hydraulic pump 30 is driven by the engine E to eject high-pressure operating oil. The steering control circuit 31 and the work machine control circuit 32 are connected to the hydraulic pump 30 in parallel, and the operating oil from the hydraulic pump 30 flows to the steering control circuit 31 and the work machine control circuit 32 in parallel.

Steering Control Circuit

Figure 3:
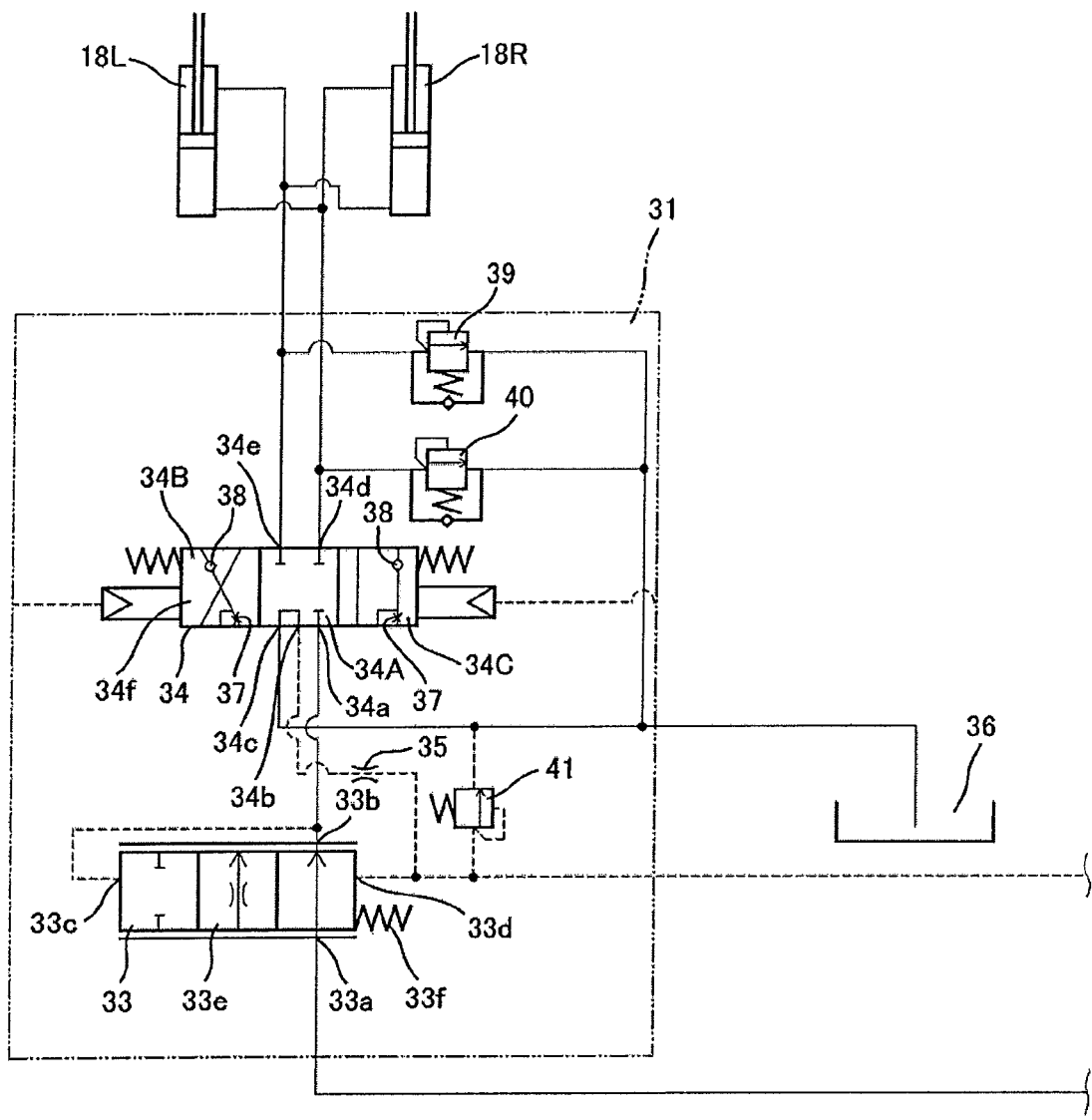
FIG. 3 is an enlarged circuit diagram showing a steering control circuit of the hydraulic control device.

FIG. 3 is an enlarged circuit diagram showing the steering control circuit 31 of the hydraulic control device 10. The following will be explained in reference to FIGS. 2 and 3. The steering control circuit 31 basically includes a meter-in pressure compensator 33 and a steering control valve 34. The meter-in pressure compensator 33 is a flow rate control valve and includes a primary port 33a connected to the hydraulic pump 30 and a secondary port 33b connected to the steering control valve 34. The meter-in pressure compensator 33 further includes two pilot ports 33c and 33d. Outlet pressure of the secondary port 33b and outlet pressure of a second port 34b of the below-described steering control valve 34 are respectively input to the pilot ports 33c and 33d and are respectively referred to as first pilot pressure and second pilot pressure. The first pilot pressure and the second pilot pressure act on a spool 33e against each other. The first pilot pressure acts on the spool 33e in a closing direction. The meter-in pressure compensator 33 is provided with a spring member 33f configured to bias the spool 33e against the first pilot pressure. The meter-in pressure compensator 33 configured as above adjusts an opening degree of the spool 33e in accordance with differential pressure between the first pilot pressure and the second pilot pressure and causes the operating oil to flow to the steering control valve 34 at a flow rate corresponding to the differential pressure. When the differential pressure becomes equal to biasing force of the spring member 33, the meter-in pressure compensator 33 causes the operating oil to flow to the steering control valve 34 at a predetermined flow rate.

The steering control valve 34 is connected to the steering cylinders 18L and 18R and can change the direction of the operating oil flowing to the steering cylinders 18L and 18R. The steering control valve 34 is a five-port direction changing valve and includes a first port 34a connected to the secondary port 33b of the meter-in pressure compensator 33. The second port 34b of the steering control valve 34 is connected to the pilot port 33d of the meter-in pressure compensator 33 through a pilot restrictor 35, and a third port 34c of the steering control valve 34 is connected to a tank 36. Each of fourth and fifth ports 34d and 34e of the steering control valve 34 is connected to the steering cylinders 18L and 18R.

Connection states of these five ports 34a to 34e change by changing the position of a spool 34f. The position of the spool 34f can be changed by operating a steering handle (hereinafter simply referred to as a "handle"), not shown. The steering control valve 34 is a so-called closed-center direction changing valve. When the spool 34f is located at a neutral position 34A, the first, fourth, and fifth ports 34a, 34d, and 34e are closed, and the second and third ports 34b and 34c are connected to each other. With this, pilot oil having been introduced to the pilot port 33d is discharged to the tank 36, and the primary and secondary ports 33a and 33b of the meter-in pressure compensator 33 are closed.

When the position of the spool 34f is changed to a first offset position 34B, the first port 34a is connected to the fifth port 34e through a check valve 38, and the third port 34c is connected to the fourth port 34d. At this time, the opening degree of the spool 34f can be adjusted by moving the spool 34f. With this, the steering cylinder 18R extends, and the steering cylinder 18L contracts, so that the front chassis 15 faces in a left direction. At this time, outlet pressure of the fifth port 34e is input to the second port 34b. Therefore, the meter-in pressure compensator 33 causes the operating oil to flow to the steering control valve 34 at a flow rate corresponding to the opening degree of the spool 34f of the steering control valve 34.

When the position of the spool 34f is changed to a second offset position 34C, the first port 34a is connected to the fourth port 34d through the check valve 38, and the third port 34c is connected to the fifth port 34e. At this time, the opening degree of the spool 34f can be adjusted by moving the spool 34f. With this, the steering cylinder 18L extends, and the steering cylinder 18R contracts, so that the front chassis 15 faces in a right direction. At this time, outlet pressure of the fourth port 34d is input to the second port 34b. Therefore, when the position of the spool 34f is changed to the second offset position 34C, the meter-in pressure compensator 33 also causes the operating oil to flow to the steering control valve 34 at a flow rate corresponding to the opening degree of the spool 34f of the steering control valve 34.

The steering control circuit 31 further includes three relief valves 39 to 41. The first and second relief valves 39 and 40 are respectively connected to the fifth and fourth ports 34e and 34d. When pressure between one of the fourth port 34d and the fifth port 34e and one of the steering cylinder 18R and the steering cylinder 18L becomes equal to or higher than predetermined pressure by, for example, external force, the operating oil is discharged to the tank 36.

The sub-relief valve 41 that is a third relief valve is connected to the pilot port 33d of the meter-in pressure compensator 33. When the second pilot pressure becomes equal to or higher than predetermined set pressure, the pilot oil introduced to the pilot port 33d is discharged to the tank 36. With this, when the pressure of the operating oil introduced to the steering cylinders 18L and 18R becomes equal to or higher than predetermined pressure, the flow rate of the operating oil flowing from the secondary port 33b to the steering cylinders 18L and 18R is limited to prevent the increase in the pressure of the operating oil. Thus, the pressure of the operating oil is maintained at the set pressure.

Work Machine Control Circuit

Figure 4:
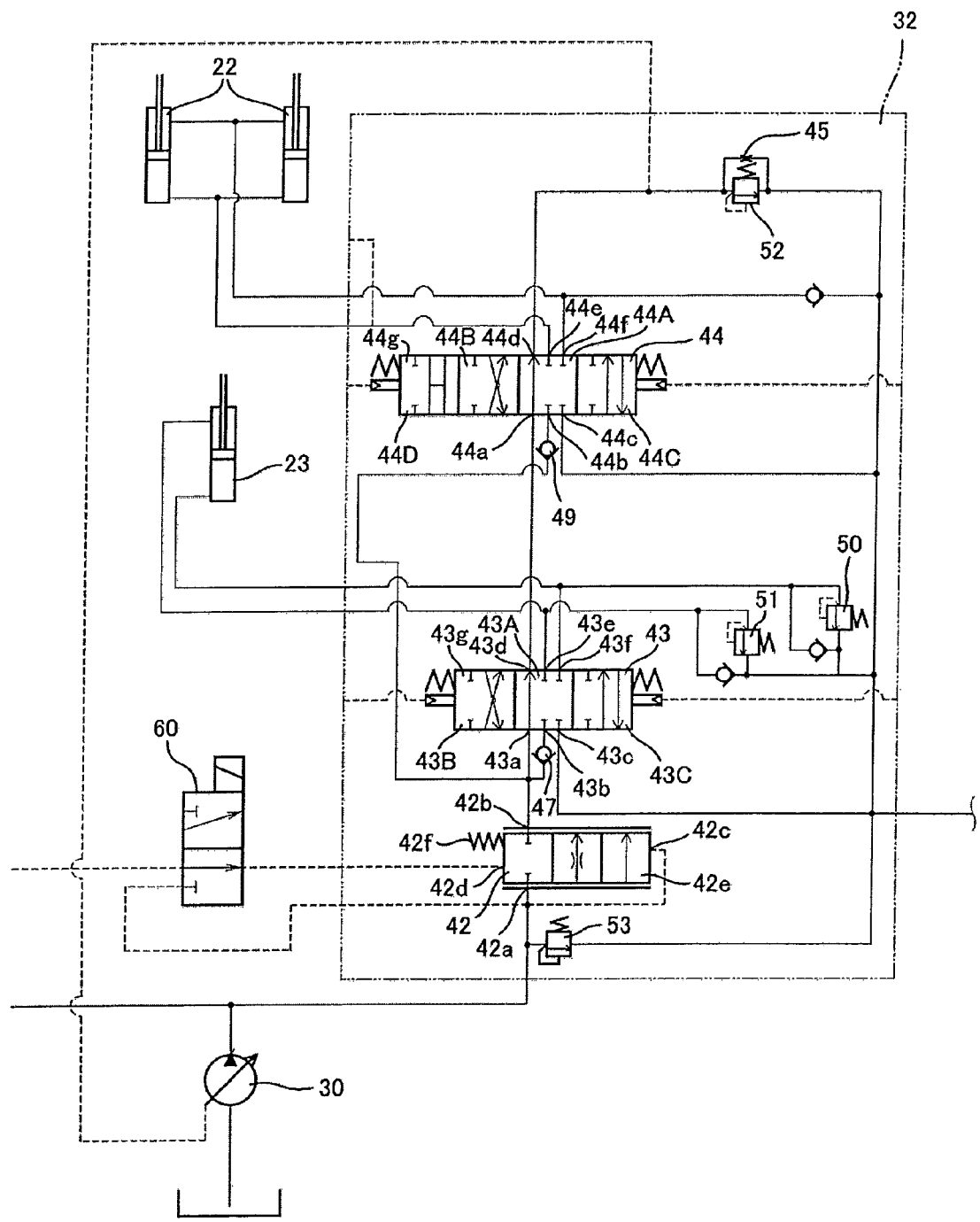
FIG. 4 is an enlarged circuit diagram showing a work machine control circuit of the hydraulic control device.
Figure 5A:
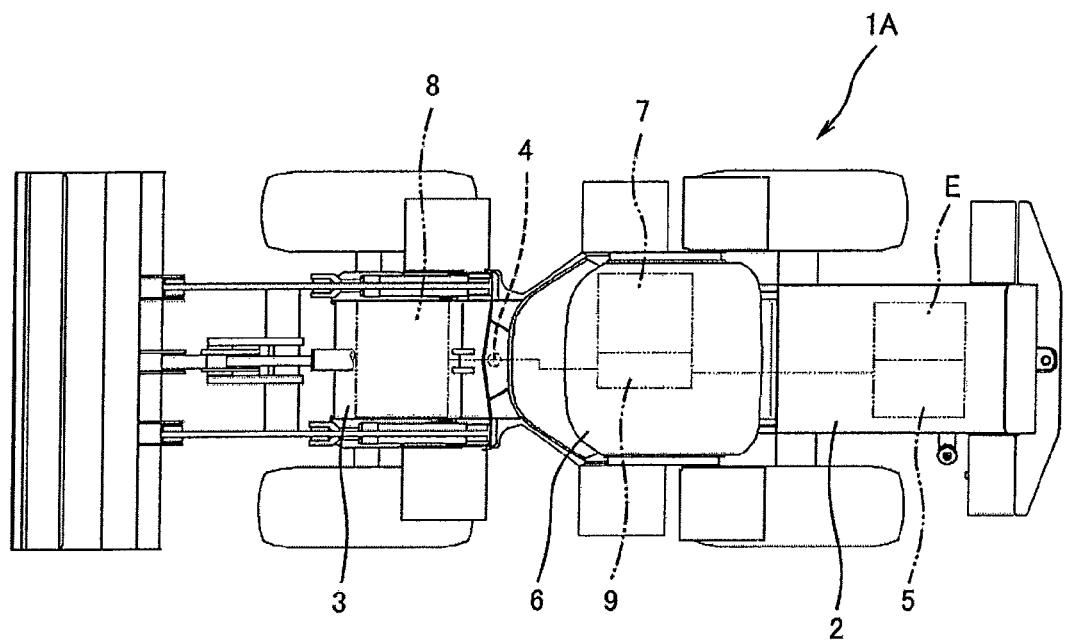
FIGS. 5A and 5B are plan views respectively showing conventional wheel loaders.
Figure 5B:
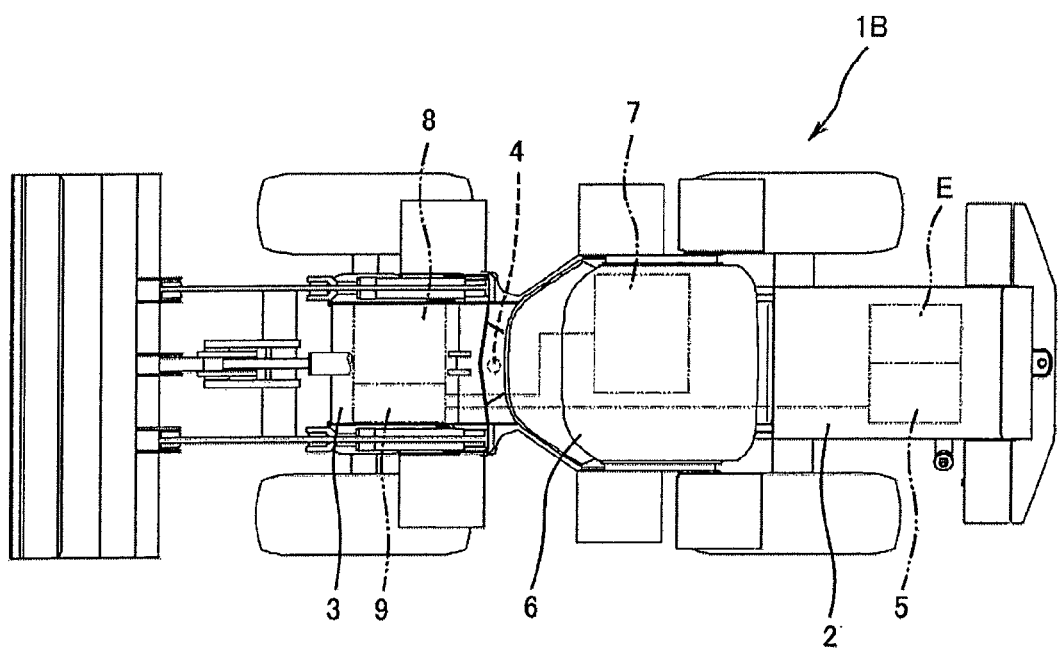

FIG. 4 is an enlarged circuit diagram showing the work machine control circuit 32 of the hydraulic control device 10. The following will be explained in reference to FIGS. 2 and 4. The work machine control circuit 32 basically includes a bleed-off pressure compensator 42, a tilt control valve 43, a boom control valve 44, and a work machine restrictor 45. The bleed-off pressure compensator 42 is a pressure control valve and includes a primary port 42a connected to the hydraulic pump 30 and a secondary port 42b connected to the tilt control valve 43. The bleed-off pressure compensator 42 further includes two pilot ports 42c and 42d.

The pilot port 42c is connected to the primary port 42a, and inlet pressure of the primary port 42a is input to the pilot port 42c. An electromagnetic switching valve 60 that is a switching unit is connected to the pilot port 42d. The electromagnetic switching valve 60 is also connected to the primary port 42a and the pilot port 33d of the meter-in pressure compensator 33. In accordance with a command, the electromagnetic switching valve 60 selects one of the inlet pressure of the primary port 42a and the second pilot pressure of the meter-in pressure compensator 33 as the pilot pressure input to the second pilot port 42d. First pilot pressure input to the pilot port 42c and second pilot pressure input to the pilot port 42d act on a spool 42e against each other, and the first pilot pressure acts on the spool 42e in an opening direction (to be specific, in such a direction that the opening degree of the spool 42e increases). The bleed-off pressure compensator 42 is provided with a spring member 42f configured to bias the spool 42 against the first pilot pressure.

The bleed-off pressure compensator 42 configured as above adjusts the opening degree of the spool 42e such that differential pressure between the first pilot pressure and the second pilot pressure becomes pressure corresponding to the biasing force of the spring member 42f. Specifically, the bleed-off pressure compensator 42 causes each of the pressure of the operating oil flowing through the meter-in pressure compensator 33 and the pressure of the operating oil flowing through the bleed-off pressure compensator 42 to become pressure higher than working pressure necessary to drive the steering cylinders 18R and 18L. The flow rate of the operating oil flowing through the bleed-off pressure compensator 42 is limited by adjusting the opening degree of the spool 42e.

The tilt control valve 43 that is one of actuator control valves is connected to the tilt cylinder 23 and can change the direction of the operating oil flowing from the bleed-off pressure compensator 42 to the tilt cylinder 23. The tilt control valve 43 is a six-port direction changing valve and includes a first port 43a connected to the secondary port 42b of the bleed-off pressure compensator 42. A second port 43b of the tilt control valve 43 is connected to the secondary port 42b of the bleed-off pressure compensator 42 through a check valve 47, and a third port 43c of the tilt control valve 43 is connected to the tank 36. A fourth port 43d of the tilt control valve 43 is connected to the boom control valve 44, and fifth and sixth ports 43e and 43f of the tilt control valve 43 are connected to the tilt cylinder 23.

Connection states of these six ports 43a to 43f change by changing the position of a spool 43g. The position of the spool 43g can be changed by operating a tilt lever (not shown) provided in the driver's seat 20. The tilt control valve 43 is a so-called open-center direction changing valve. When the spool 43g is located at the neutral position 43A, the first port 43a and the fourth port 43d are connected to each other, and the other four ports 43b, 43c, 43e, and 43f are closed.

When the position of the spool 43g is changed to a first offset position 43B, the first and fourth ports 43a and 43d are closed. In contrast, the second port 43b is connected to the sixth port 43f, and the third port 43c is connected to the fifth port 43e. With this, the tilt cylinder 23 extends, so that the bucket 12 tilts upward. When the position of the spool 43g is changed to a second offset position 43C, the first and fourth ports 43a and 43d remain closed, but the second port 43b is connected to the fifth port 43e, and the third port 43c is connected to the sixth port 43f. With this, the tilt cylinder 23 contracts, so that the bucket 12 tilts downward.

The tilt control valve 43 configured as above can cause the bucket 12 to tilt in the upper-lower direction by operating the tilt lever. In a state where the tilt lever is not being operated, the spool 43g is located at the neutral position 43A, so that the operating oil flowing through the tilt control valve 43 flows through the first and fourth ports 43a and 43d to be introduced to the boom control valve 44.

The boom control valve 44 that is one of the actuator control valves is connected to the boom cylinders 22 and can change the direction of the operating oil flowing from the bleed-off pressure compensator 42 to the boom cylinders 22. The boom control valve 44 is a six-port direction changing valve and includes a first port 44a connected to the fourth port 43d of the tilt control valve 43. A second port 44b of the boom control valve 44 is connected to the secondary port 42b of the bleed-off pressure compensator 42 through a check valve 49, and a third port 44c of the boom control valve 44 is connected to the tank 36. A fourth port 44d of the boom control valve 44 is connected to the restrictor 45, and each of fifth and sixth ports 44e and 44f of the boom control valve 44 is connected to the two boom cylinders 22.

Connection states of these six ports 44a to 44f change by changing the position of a spool 44g. The position of the spool 44g can be changed by operating a lift lever (not shown) provided in the driver's seat 20. The boom control valve 44 is a so-called open-center direction changing valve. When the spool 44g is located at a neutral position 44A, the first port 44a and the fourth port 44d are connected to each other, and the other four ports 44b, 44c, 44e, and 44f are closed.

When the position of the spool 44g is changed to a first offset position 44B, the first and fourth ports 44a and 44d are closed. In contrast, the second port 44b is connected to the sixth port 44f, and the third port 44c is connected to the fifth port 44e. With this, the two boom cylinders 22 contract, so that the bucket 12 can be moved downward. When the position of the spool 44g is changed to a second offset position 44C, the first and fourth ports 44a and 44d remain closed, but the second port 44b is connected to the fifth port 44e, and the third port 44c is connected to the sixth port 44f. With this, the boom cylinder 22 extends, so that the bucket 12 can be moved upward.

Further, the boom control valve 44 is configured such that the position thereof can be changed to a third offset position 44D. When the position of the spool 44g is changed to the third offset position 44D, the first and fourth ports 44a and 44d remain closed, and the second, third, fifth, and sixth ports 44b, 44c, 44e, and 44f are connected to the tank 36. With this, holding power of the boom cylinders 22 disappears, so that the booms 21 can be moved at will.

The boom control valve 44 configured as above can cause the booms 21 to move up and down in the upper-lower direction by operating the lift lever. In a state where the lift lever is not being operated, the spool 44g is located at the neutral position 44A, so that the operating oil flowing from the tilt control valve 43 flows through the boom control valve 44 to be introduced through the work machine restrictor 45 to the tank 36. By causing the operating oil to flow through the work machine restrictor 45, pressure is generated at an upstream side of the work machine restrictor 45. This pressure is introduced as a tilt command signal to the hydraulic pump 30, and the hydraulic pump 30 changes its ejection amount of operating oil in accordance with the pressure of the tilt command signal. The hydraulic pump 30 reduces the ejection amount as the pressure of the tilt command signal increases. With this, the work machine control circuit 32 realizes negative control.

The work machine control circuit 32 is provided with four relief valves 50 to 53. The first and second relief valves 50 and 51 are respectively connected to sixth and fifth ports 43f and 43e of the tilt control valve 43. When pressure between one of the fifth port 43d and the sixth port 43f and one of the bucket cylinders 22 becomes equal to or higher than predetermined pressure by, for example, external force, the operating oil flowing therethrough is discharged to the tank 36.

The third relief valve 52 is connected to the work machine restrictor 45 in parallel. When the pressure of the operating oil flowing through the work machine restrictor 45 becomes equal to or higher than predetermined pressure, the operating oil is discharged to the tank 36. With this, the pressure of the tilt command signal can be prevented from becoming predetermined pressure or higher.

The main relief valve 53 that is a fourth relief valve is provided in parallel with the bleed-off pressure compensator 42. When ejection pressure of the hydraulic pump 30 becomes equal to or higher than predetermined specified pressure, the operating oil from the hydraulic pump 30 is discharged to the tank 36. By this main relief valve 53, not only the pressure of the operating oil flowing from the hydraulic pump 30 to the work machine control circuit 32 but also the pressure of the operating oil flowing through the steering control circuit 31 can be maintained at lower than the specified pressure.

Operations of Hydraulic Control Device

Hereinafter, the operations of the hydraulic control device 10 will be explained in reference to FIG. 2. According to the hydraulic control device 10, when the engine E is driven, the hydraulic pump 30 ejects the operating oil. The operating oil is caused to flow to the steering control circuit 31 and the work machine control circuit 32. In a state where the handle is not being operated, the steering control valve 34 is located at the neutral position 34A. Therefore, the flow of the operating oil from the steering control valve 34 to the steering cylinders 18L and 18R is blocked, and the pilot port 33d of the meter-in pressure compensator 33 is connected to the tank 36, so that communication between the primary port 33a and the secondary port 33b is blocked. On this account, the flow of the operating oil from the meter-in pressure compensator 33 to the steering control valve 34 is stopped.

Here, in a case where the pilot port 42d of the bleed-off pressure compensator 42 and the pilot port 33d of the meter-in pressure compensator 33 are connected to each other by the electromagnetic switching valve 60, the pilot port 42d of the bleed-off pressure compensator 42 is also connected to the tank 36. Therefore, the spool 42e of the bleed-off pressure compensator 42 moves in the opening direction, so that the operating oil flows through the bleed-off pressure compensator 42. In this situation, the tilt control valve 43 and the boom control valve 44 are respectively located at the neutral positions 43A and 44A, and the operating oil having flowed through the bleed-off pressure compensator 42 flows through the tilt control valve 43 and the boom control valve 44 to flow through the work machine restrictor 45 to the tank 36.

In the above case, the operating oil does not flow through the steering cylinder 18L, the steering cylinder 18R, the boom cylinder 22, or the tilt cylinder 23. Therefore, the entire operating oil from the hydraulic pump 30 flows to the work machine restrictor 45, so that the pressure generated at the upstream side of the work machine restrictor 45 increases. The hydraulic pump 30 receives this pressure as the tilt command signal and decreases the ejection amount until the pressure of the tilt command signal decreases to predetermined pressure. With this, the ejection amount is decreased to a predetermined minimum flow rate.

Next, when the position of the steering control valve 34 is changed to the first offset position 34B by operating the handle, the operating oil is introduced from the steering control valve 34 to the steering cylinders 18L and 18R. With this, the second pilot pressure increases, and the spool 33e of the meter-in pressure compensator 33 moves in the opening direction (to be specific, in such a direction that the opening degree of the spool 42e decreases), so that the amount of operating oil flowing from the meter-in pressure compensator 33 through the steering control valve 34 to the steering cylinders 18L and 18R increases. With this, the steering cylinder 18R extends, and the steering cylinder 18L contracts, so that the front chassis 15 faces in the left direction.

After that, the meter-in pressure compensator 33 causes the operating oil to flow to the steering control valve 34 at a flow rate corresponding to a pressure difference between pressure in front of a variable restrictor 37 of the steering control valve 34 and pressure behind the variable restrictor 37, that is, at a flow rate corresponding to the opening degree of the spool 34f of the steering control valve 34. To be specific, the meter-in pressure compensator 33 performs pressure compensation with respect to the flow rate of the operating oil flowing through the steering cylinders 18L and 18R. Therefore, even in a case where the pressure of the operating oil flowing through the meter-in pressure compensator 33 changes, an operational feeling of the handle does not change.

Similarly, in a case where the position of the steering control valve 34 is changed to the second offset position 34C by operating the handle, the amount of operating oil flowing from the meter-in pressure compensator 33 through the steering control valve 34 to the steering cylinders 18L and 18R increases. With this, the steering cylinder 18R contracts, and the steering cylinder 18L extends, so that the front chassis 15 faces in the right direction. The meter-in pressure compensator 33 performs the pressure compensation with respect to the flow rate of the operating oil flowing through the steering cylinders 18L and 18R. Therefore, even in a case where the pressure of the operating oil flowing through the meter-in pressure compensator 33 changes, the operational feeling of the handle does not change.

Since the operating oil flows through the steering cylinders 18L and 18R as above, the second pilot pressure of the bleed-off pressure compensator 42 increases. In accordance with this increase, the spool 42e of the bleed-off pressure compensator 42 moves in the closing direction, so that the opening degree of the spool 42e decreases. The pressure of the operating oil flowing through the bleed-off pressure compensator 42 is made higher than the pressure of the operating oil flowing through the steering cylinders 18L and 18R by pressure corresponding to the biasing force of the spring member 42f, and the pressure of the operating oil flowing through the meter-in pressure compensator 33 is made higher than the working pressure necessary to drive the steering cylinders 18L and 18R. With this, the flow rate of the operating oil flowing through the bleed-off pressure compensator 42 decreases.

By increasing the pressure of the operating oil to decrease the flow rate as above, the operating oil easily flows from the hydraulic pump 30 to the steering cylinders 18L and 18R at a stable flow rate. To be specific, when driving the steering cylinders 18L and 18R, the operating oil from the hydraulic pump 30 can be caused to preferentially flow to the steering cylinders 18L and 18R at the stable flow rate. To be specific, without using a conventional priority valve, the operating oil can be caused to preferentially flow to the steering cylinders 18L and 18R at the stable flow rate.

When the flow rate of the operating oil flowing through the bleed-off pressure compensator 42 decreases, the flow rate of the operating oil flowing through the upstream side of the work machine restrictor 45 decreases, so that the pressure generated at the upstream side of the work machine restrictor 45 decreases. To be specific, the pressure of the tilt command signal decreases, so that the ejection amount of the hydraulic pump 30 increases. With this, the operating oil is ejected from the pump at a flow rate slightly higher than the flow rate required by the steering control valve 34. Thus, the operating oil is stably supplied to the steering cylinders 18L and 18R.

Further, when the pressure of the operating oil flowing through the steering cylinders 18L and 18R increases, and the second pilot pressure of the meter-in pressure compensator 33 becomes equal to or higher than the set pressure, the sub-relief valve 41 opens. With this, the pilot oil is discharged to the tank 36, so that the second pilot pressure is maintained at lower than the set pressure. The first pilot pressure continues to increase as the pressure of the operating oil flowing through the steering cylinders 18L and 18R increases. With this, the spool 33e of the meter-in pressure compensator 33 moves in the closing direction. Thus, the flow rate of the oil flowing through the steering cylinders 18L and 18R is limited, so that the pressure of the operating oil is prevented from increasing. To be specific, the highest pressure of the operating oil flowing through the steering cylinders 18L and 18R is predetermined pressure corresponding to the set pressure.

Further, the second pilot pressure of the bleed-off pressure compensator 42 is also maintained at the set pressure by the sub-relief valve 41. Therefore, the spool 42e of the bleed-off pressure compensator 42 moves in the opening direction, so that the opening degree of the spool 42e increases. Thus, the flow rate of the operating oil flowing through the bleed-off pressure compensator 42 increases. With this, the flow rate of the operating oil flowing through the bleed-off pressure compensator 42 increases, and the flow rate of the operating oil flowing from the hydraulic pump 30 toward the meter-in pressure compensator 33 can be limited to lower than a predetermined flow rate.

By limiting the flow rate of the operating oil flowing through the meter-in pressure compensator 33 to lower than the predetermined flow rate as above, it becomes unnecessary to increase the diameter of the spool 33e of the meter-in pressure compensator 33 in accordance with the ejection amount of oil the hydraulic pump can eject. To be specific, the diameter of the spool 33e of the meter-in pressure compensator 33 can be made small in accordance with the flow rate of the operating oil flowing therethrough, so that the spool diameter of the meter-in pressure compensator 33 can be configured to be the same as the spool diameter of the steering control valve 34. With this, it becomes easy to manufacture a unit configured by integrating the meter-in pressure compensator 33 and the steering control valve.

Since the flow rate of the operating oil flowing through the bleed-off pressure compensator 42 is the same as each of the flow rate of the operating oil flowing through the tilt control valve 43 and the flow rate of the operating oil flowing through the boom control valve 44, the spool diameter of the bleed-off pressure compensator 42 is configured to be the same as each of the spool diameter of the tilt control valve 43 and the spool diameter of the boom control valve 44 in many cases. Therefore, it is easy to manufacture a unit configured by integrating the bleed-off pressure compensator 42, the tilt control valve 43, and the boom control valve 44.

When the opening degree of the spool 42e of the bleed-off pressure compensator 42 is increased to limit the flow rate of the operating oil flowing from the hydraulic pump 30 to the meter-in pressure compensator 33 to lower than the predetermined flow rate, the pressure at the upstream side of the work machine restrictor 45 increases. With this, the ejection amount of the hydraulic pump 30 decreases, and the operating oil is supplied at a stable flow rate.

When the position of the spool 43g of the tilt control valve 43 is changed to the first offset position 43B by operating the tilt lever, the flow of the operating oil to the work machine restrictor 45 stops, so that the pressure at the upstream side of the work machine restrictor 45 decreases. With this, the ejection amount of the hydraulic pump 30 increases. Since the flow rate of the operating oil flowing through the steering cylinders 18L and 18R is maintained at a predetermined flow rate, the flow rate of the operating oil flowing through the bleed-off pressure compensator 42 increases as the ejection amount of the hydraulic pump 30 increases. Since the operating oil flowing through the bleed-off pressure compensator 42 flows to the tilt cylinder 23, the tilt cylinder 23 extends, so that the bucket 12 tilts upward.

In a case where the position of the spool 43g of the tilt control valve 43 is changed to the second offset position 43C by operating the tilt lever, the same operations as a case where the position of the spool 43g is changed to the first offset position 43B are performed except that the tilt cylinder 23 contracts. In a case where the position of the spool 44g of the boom control valve 44 is changed by operating the lift lever, the same operations as a case where the tilt lever is operated are performed except that the actuator that extends and contracts is the boom cylinder 22.

In a case where the handle is not being operated, the operating oil flowing from the hydraulic pump 30 to the steering cylinders 18L and 18R is blocked by the meter-in pressure compensator 33 as described above. At this time, by operating the tilt lever or the lift lever, the entire operating oil from the hydraulic pump 30 flows through the bleed-off pressure compensator 42 to flow through the tilt cylinder 23, the boom cylinder 22, or both the two cylinders 22 and 23. With this, the operating oil can be caused to flow through the tilt cylinder 23 or the boom cylinder 22 at a flow rate higher than the flow rate in a case where the tilt lever or the lift lever is operated simultaneously with the handle. Thus, the tilt cylinder 23 or the boom cylinder 22 can be caused to move at high speed.

When the tilt cylinder 23 or the boom cylinder 22 is driving as above, and the pressure of the operating oil flowing through the bleed-off pressure compensator 42 becomes equal to or higher than the specified pressure, the main relief valve 53 discharges to the tank 36 the operating oil flowing through the bleed-off pressure compensator 42. With this, the highest pressure of the operating oil flowing through the tilt cylinder 23 or the boom cylinder 22 can be set to the specified pressure. Therefore, the highest pressure of the operating oil flowing through the work machine control circuit 32 and the highest pressure of the operating oil flowing through the steering control circuit 31 can be set separately.

The following will explain a case where in the hydraulic control device 10 configured to operate as above, the pilot pressure input to the pilot port 42d of the bleed-off pressure compensator 42 is changed to the inlet pressure of the primary port 42a by the electromagnetic switching valve 60, that is, the pump pressure by the electromagnetic switching valve 60. When the pilot pressure is changed, the loads that are equal to each other respectively act on both end portions of the spool 42e of the bleed-off pressure compensator 42. Thus, regardless of the operations of the handle, the tilt lever, and the lift lever, the spool 42e of the bleed-off pressure compensator 42 is maintained at the closed position. With this, the operating oil ejected from the pump 30 flows through the main relief valve 53 to return to the tank 36. With this, the ejection pressure of the pump 30 increases to the specified pressure of the main relief valve 53. Thus, the load of the engine E can be increased. According to the hydraulic control device 10, even in a case where the load of the engine E is forcibly increased, the operating oil can be caused to flow to the steering cylinders 18R and 18L by the meter-in pressure compensator 33 at a stable flow rate by operating the handle. Therefore, even in a case where the load of the engine E is forcibly increased, the steering cylinders 18R and 18L can be driven arbitrarily.

To be specific, the load of the engine E can be forcibly increased by inputting the pump pressure to the pilot port 42d of the bleed-off pressure compensator 42 by the electromagnetic switching valve 60. The meter-in pressure compensator 33 and the bleed-off pressure compensator 42 are configured separately, so that even in a case where the load of the engine E is forcibly increased, the steering cylinders 18L and 18R can be operated.

The present embodiment has explained a case where the hydraulic control device 10, 100 is mounted on the wheel loader 11. However, the hydraulic control device 10, 100 may be mounted on any construction machinery, such as a bulldozer. The hydraulic control device 10, 100 drives two actuators that are the boom cylinder 22 and the tilt cylinder 23. However, the hydraulic control device 10, 100 may drive any one of the above two actuators, or may include three or more actuators and drive the three or more actuators. The type of the steering device and the actuator is not limited to a cylinder and may be a hydraulic motor.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention.

REFERENCE SIGNS LIST 10 hydraulic control device
11 wheel loader
18L, 18R steering cylinder
22 boom cylinder
23 tilt cylinder
30 hydraulic pump
33 meter-in pressure compensator
34 steering control valve
36 steering tank
41 sub-relief valve
42 bleed-off pressure compensator
43 tilt control valve
44 boom control valve
45 work machine restrictor
48 work machine tank
53 main relief valve

The invention claimed is:

1. A hydraulic control device comprising:
a steering device;
a plurality of work machine actuators;
a hydraulic pump connected to the steering device and the plurality of work machine actuators so as to supply operating oil to the steering device and the work machine actuators in parallel;
a steering control valve configured to cause a spool thereof to move to control a direction of the operating oil flowing to the steering device;
a plurality of actuator control valves provided so as to correspond to the respective work machine actuators, each of the actuator control valves being configured to connect the hydraulic pump to a tank when the actuator control valve is located at a neutral position and control the direction of the operating oil flowing through the corresponding work machine actuator when the actuator control valve is located at an offset position;
a meter-in pressure compensator including a first pilot port and a second pilot port and provided upstream of a steering control circuit including the steering control valve, to control a flow of the operating oil, supplied to the steering control valve, to maintain differential pressure between pressure of the operating oil at an upstream side of the steering control valve and pressure of the operating oil at a downstream side of the steering control valve at constant pressure regardless of an opening degree of the spool of the steering control valve, the pressure of the operating oil at the downstream side of the steering control valve being input as first pilot pressure to the first pilot port and corresponding to load pressure of the steering device, the pressure of the operating oil at the upstream side of the steering control valve being input as second pilot pressure to the second pilot port against the first pilot pressure; and
a bleed-off pressure compensator including a third pilot port and a fourth pilot port and provided upstream of a work machine control circuit including the plurality of actuator control valves, to control the flow of the operating oil supplied to the actuator control valves, the pressure of the operating oil at the downstream side of the steering control valve being input as third pilot pressure to the third pilot port and corresponding to the load pressure of the steering device, ejection pressure of the hydraulic pump being input as fourth pilot pressure to the fourth pilot of port against the third pilot pressure, wherein:
the meter-in pressure compensator and the bleed-off pressure compensator are connected to the hydraulic pump in parallel with each other,
when the steering device is operated, the load pressure of the steering device during the operation is input to the first pilot port of the meter-in pressure compensator to act against the pressure of the operating oil at the upstream side of the steering control valve, and the meter-in pressure compensator therefore operates to open a passage through which the hydraulic pump and the steering control valve communicate with each other, while adjusting an opening degree of the passage, through which the hydraulic pump and the steering control valve communicate with each other, in accordance with differential pressure between the load pressure input to the first pilot port and the pressure of the operating oil at the upstream side of the steering control valve which pressure is input to the second pilot port, and
when the steering device is operated, the load pressure of the steering device during the operation is input to the third pilot port of the bleed-off pressure compensator to act against the ejection pressure of the hydraulic pump, and the bleed-off pressure compensator therefore operates to close a passage through which the hydraulic pump and the actuator control valve communicate with each other, while adjusting an opening degree of the passage, through which the hydraulic pump and the actuator control valve communicate with each other, in accordance with differential pressure between the load pressure input to the third pilot port and the ejection pressure input to the fourth pilot port.

2. The hydraulic control device according to claim 1, wherein the bleed-off pressure compensator operates so as to:
decrease the flow rate of the operating oil, supplied to the actuator control valve, in accordance with an increase in the pressure of the operating oil supplied to the steering device; and
cause the pressure of the operating oil, ejected from the hydraulic pump, to become pressure higher than the pressure of the operating oil necessary to drive the steering device.

3. The hydraulic control device according to claim 2, further comprising a restrictor interposed between the actuator control valve and the tank, wherein
the hydraulic pump is a variable displacement pump configured to adjust an ejection flow rate thereof in accordance with the pressure of the operating oil flowing between the actuator control valve and the restrictor.

4. The hydraulic control device according to claim 3, wherein the meter-in pressure compensator utilizes the operating oil at the upstream side of the steering control valve and the operating oil at the downstream side of the steering control valve as two different pilot oil acting against each other,
the hydraulic control device further comprising
a steering relief valve configured to discharge the pilot oil, which is the operating oil at the downstream side, to the tank when the pressure of the pilot oil, which is the operating oil at the downstream side, becomes predetermined pressure.

5. A construction machinery comprising the hydraulic control device according to claim 4.

6. A construction machinery comprising the hydraulic control device according to claim 3.

7. The hydraulic control device according to claim 2, wherein the meter-in pressure compensator utilizes the operating oil at the upstream side of the steering control valve and the operating oil at the downstream side of the steering control valve as two different pilot oil acting against each other, the hydraulic control device further comprising a steering relief valve configured to discharge the pilot oil, which is the operating oil at the downstream side, to the tank when the pressure of the pilot oil, which is the operating oil at the downstream side, becomes predetermined pressure.

8. A construction machinery comprising the hydraulic control device according to claim 7.

9. A construction machinery comprising the hydraulic control device according to claim 2.

10. The hydraulic control device according to claim 1, further comprising a restrictor interposed between the actuator control valve and the tank, wherein the hydraulic pump is a variable displacement pump configured to adjust an ejection flow rate thereof in accordance with the pressure of the operating oil flowing between the actuator control valve and the restrictor.

11. The hydraulic control device according to claim 10, wherein the meter-in pressure compensator utilizes the operating oil at the upstream side of the steering control valve and the operating oil at the downstream side of the steering control valve as two different pilot oil acting against each other, the hydraulic control device further comprising a steering relief valve configured to discharge the pilot oil, which is the operating oil at the downstream side, to the tank when the pressure of the pilot oil, which is the operating oil at the downstream side, becomes predetermined pressure.

12. A construction machinery comprising the hydraulic control device according to claim 11.

13. A construction machinery comprising the hydraulic control device according to claim 10.

14. The hydraulic control device according to claim 1, wherein the meter-in pressure compensator utilizes the operating oil at the upstream side of the steering control valve and the operating oil at the downstream side of the steering control valve as two different pilot oil acting against each other, the hydraulic control device further comprising a steering relief valve configured to discharge the pilot oil, which is the operating oil at the downstream side, to the tank when the pressure of the pilot oil, which is the operating oil at the downstream side, becomes predetermined pressure.

15. A construction machinery comprising the hydraulic control device according to claim 14.

16. A construction machinery comprising the hydraulic control device according to claim 1.

* * * * *